3,538,120
CYCLOPENTYL-ALKANOIC ACIDS
Neville Finch, Irvington, N.J., assignor to Ciba Corporation, New York, N.Y., a corporation of Delaware
No Drawing. Filed May 22, 1967, Ser. No. 640,374
Int. Cl. C07d 7/04; C07c 61/32, 69/74
U.S. Cl. 260—345.8                                    6 Claims

ABSTRACT OF THE DISCLOSURE

The hydrolysis of oximes having the formula

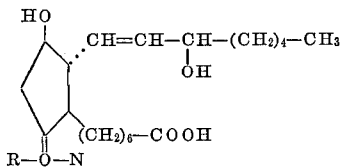

R=H, alkyl, alkenyl, cycloalkyl, haloalkyl or aralkyl, the esters and/or salts thereof, yields the corresponding hypotensive ketone.

SUMMARY OF THE INVENTION

The present invention concerns and has for its object the provision of the ω-[2α-(3-hydroxy-1-octenyl)-3β-hydroxy-5-oxo-cyclopentyl]-heptanoic acid of the Formula I

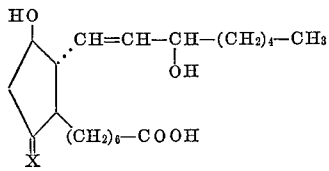

(I)

wherein X stands for oxo, its esters and/or salts, by cleavage of the corresponding oximes of Formula I in which X stands for unsubstituted or aliphatically substituted hydroxyimino group, methods for their preparation, as well as new intermediates. The optically active acid of Formula I, in which X stands for oxo, is the known prostaglandin $E_1$ or $PGE_1$, which is a potent hypotensive agent in mammals.

DESCRIPTION OF THE PREFERRED EMBODIMENTS

The O-substituents of the above hydroxyimino group X are, for example, lower alkyl, such as methyl, ethyl, n- or i- propyl, -butyl, -pentyl, -hexyl or -heptyl; lower alkenyl, such as allyl or methallyl; cycloalkyl or cycloalkyl-lower alkyl containing preferably 3 to 6 ring- and 1 to 4 chain-carbon atoms, such as cyclopropyl, cyclopentyl, cyclohexyl, cyclopropylmethyl, cyclopentylmethyl, cyclohexylmethyl, 1- or 2-cyclopentylethyl or 1-, 2- or 3-cyclohexyl-propyl. These aliphatic radicals may be substituted, for example, by esterified hydroxy groups, preferably one or more than one halogen atom, such as chloro or bromo, being separated from the oxygen atom of the oxime group by at least 2 carbon atoms, and/or an aromatic radical, preferably phenyl or phenyl substituted by one or more than one of the same or different substituents, such as lower alkyl, e.g. methyl, ethyl, n- or i-propyl or -butyl, lower alkoxy, e.g. methoxy, ethoxy, n- or i-propoxy or -butoxy, lower alkylenedioxy, e.g. methylenedioxy, 1,1- or 1,2-ethylenedioxy, halogeno, e.g. fluoro, chloro, bromo or iodo, trifluoromethyl, nitro or amino, such as di-lower alkylamino, e.g. dimethylamino or diethylamino. Preferred substituted aliphatic radicals are 2-chloro- or bromo-ethyl, -propyl or -butyl, 2,2-dichloro-ethyl, -propyl or -butyl, 3,3,3-trichloroethyl, 3-chloro- or bromo-propyl or -butyl, 4-chloro- or bromo-butyl, R-methyl, 1- or 2-R-ethyl, in which R stands for phenyl, (lower alkyl)-phenyl, (lower alkoxy)-phenyl, (lower alkylene-dioxy)-phenyl, (halogeno)-phenyl, (trifluoromethyl)-phenyl, (nitro)-phenyl or (di-lower alkylamino)-phenyl.

The esters of the acids of Formula I in which X stands of oxo or said hydroxyimino group, more particularly are those of alcohols, preferably aliphatic or araliphatic alcohols, such as those containing the above-described aliphatic or araliphatic radicals bound at the carboxyl group. Salts of said acids are, more particularly, those of alkali or alkaline earth metals, e.g. sodium, potassium, magnesium or calcium, or ammonium salts derived from ammonia or amines, preferably aliphatic amines, such as mono-, di- or tri-lower alkylamines, e.g. methylamine, ethylamine, diethylamine or triethylamine, or heterocyclic bases, e.g. pyrrole, pyrrolidine, pyridine, lutidine, piperidine, piperazine and the like, or therapeutically useful bases, such as 2-heptamethylene-ethylguanidine, 1-hydrazino- or 1,4-dihydrazino-phthalazine, 3-methylamino-isocamphane, N-methyl-N-2-propynyl-benzylamine, glucosamine, glutamine, galactamine, epinephrine, norepinephrine, ephedrine, phenylephrine, procaine and the like.

Particularly useful starting materials in the process of the invention are those of Formula I, wherein X stands for hydroxyimino, lower alkoxyimino, 2-mono-, di- or trihalogeno-lower alkoxyimino and the lower alkylesters of these compounds.

Especially valuable are the compounds of Formula I, in which X stands for hydroxyimino, methoxyimino and particularly 2-bromo-ethoxyimino.

The cleavage of said oximes, according to the present invention, is advantageously carried out by hydrolysis in the presence or absence of a hydroxylamine acceptor, preferably under mild conditions. In said hydrolysis advantageously aqueous acids are used, for example, mineral acids or strong organic acids, such as hydrohalic acids, sulfuric or perchloric acid; carboxylic or sulfonic acids, such as trifluoroacetic or p-toluene sulfonic acid. Hydroxylamine acceptors are preferably oxo-compounds, which at the same time also may serve as hydrolytic agent (for example ketoacids) e.g. formaldehyde, acetone or levulinic acid; or nitrous acid and the like.

The cleavage of the oximes can also be carried out stepwise. For example, the 2-bromo-alkoxyimino compounds can be converted into the O-unsubstituted oximes by reductive cleavage, advantageously with the use of metals, such as magnesium or preferably zinc, or reductive metal salts, such as chromium II acetate, whereby unsaturated aliphatic or araliphatic hydrocarbons are generated. The resulting O-unsubstituted oximes can easily be cleaved under mild conditions, for example with the use of aqueous carboxylic acids, such as acetic acid, advantageously in the presence of nitrous acid.

The starting material used in the present process, as well as the intermediates in its synthesis, i.e. the compounds of the Formulae I (X=a hydroxyimino group) and III to XII shown below, are new and are intended to be included within the scope of the present invention. They are prepared according to the following formula scheme:

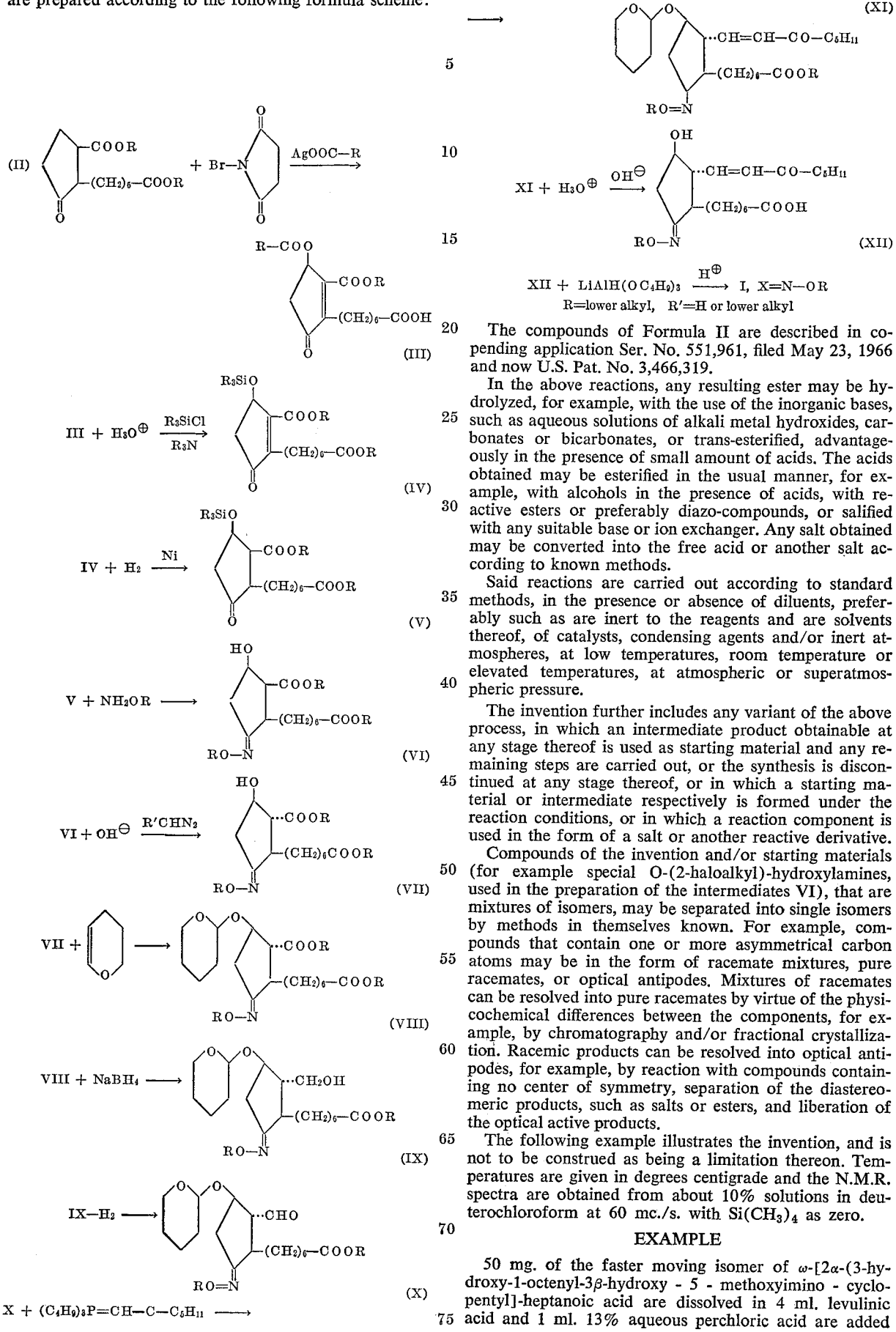

$$\text{XII} + \text{LiAlH}(OC_4H_9)_3 \xrightarrow{H^\oplus} \text{I, X=N—OR}$$

R=lower alkyl, R′=H or lower alkyl

The compounds of Formula II are described in copending application Ser. No. 551,961, filed May 23, 1966 and now U.S. Pat. No. 3,466,319.

In the above reactions, any resulting ester may be hydrolyzed, for example, with the use of the inorganic bases, such as aqueous solutions of alkali metal hydroxides, carbonates or bicarbonates, or trans-esterified, advantageously in the presence of small amount of acids. The acids obtained may be esterified in the usual manner, for example, with alcohols in the presence of acids, with reactive esters or preferably diazo-compounds, or salified with any suitable base or ion exchanger. Any salt obtained may be converted into the free acid or another salt according to known methods.

Said reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The invention further includes any variant of the above process, in which an intermediate product obtainable at any stage thereof is used as starting material and any remaining steps are carried out, or the synthesis is discontinued at any stage thereof, or in which a starting material or intermediate respectively is formed under the reaction conditions, or in which a reaction component is used in the form of a salt or another reactive derivative.

Compounds of the invention and/or starting materials (for example special O-(2-haloalkyl)-hydroxylamines, used in the preparation of the intermediates VI), that are mixtures of isomers, may be separated into single isomers by methods in themselves known. For example, compounds that contain one or more asymmetrical carbon atoms may be in the form of racemate mixtures, pure racemates, or optical antipodes. Mixtures of racemates can be resolved into pure racemates by virtue of the physicochemical differences between the components, for example, by chromatography and/or fractional crystallization. Racemic products can be resolved into optical antipodes, for example, by reaction with compounds containing no center of symmetry, separation of the diastereomeric products, such as salts or esters, and liberation of the optical active products.

The following example illustrates the invention, and is not to be construed as being a limitation thereon. Temperatures are given in degrees centigrade and the N.M.R. spectra are obtained from about 10% solutions in deuterochloroform at 60 mc./s. with $Si(CH_3)_4$ as zero.

EXAMPLE 50 mg. of the faster moving isomer of ω-[2α-(3-hydroxy-1-octenyl-3β-hydroxy - 5 - methoxyimino - cyclopentyl]-heptanoic acid are dissolved in 4 ml. levulinic acid and 1 ml. 13% aqueous perchloric acid are added while stirring and keeping the temperature at 6°. After two days the mixture is diluted with ice water, extracted with diethyl ether, the extract washed with water, dried, filtered and evaporated. The residue is allowed to stand for 5 hours in a high vacuum and is then chromatographed on infusorial earth and eluted with the upper phase obtained from the mixture of (a) the lower phase of 560 ml. methanol and 684 ml. water, (b) 60 ml. octanol and (c) 60 ml. chloroform, at room temperature. The combined 5 ml. samples containing the slower moving fraction are evaporated to yield the racemic prostaglandine $E_1$ of the formula

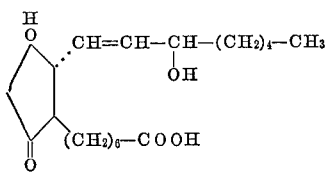

It shows the relative physical data and pharmacological activity as the optically active material product, described in U.S. Pat. No. 3,069,322.

The faster moving fraction of the eluate yields the ω-[2α-(3-hydroxy-1-octenyl)-5 - oxo-3-cyclopentyl]-heptanoic acid of the formula

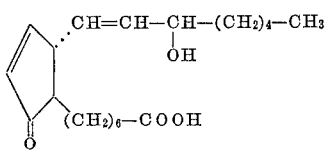

whose spectral and pharmacological data are identical with those given for the optically active compound described in Biochem. Biophys. Res. Communications 21, 413 (1965).

The starting material is prepared as follows: 43.0 g. 2-(6-carboxy-hexyl)-3 - oxo-1 - cyclopentene-carboxylic acid are dissolved in the minimum amount of diethyl ether, and to the stirred solution ethereal diazomethane is added dropwise until the yellow color persists. The mixture is evaporated in vacuo, the residue distilled and the fraction boiling at 146°/0.1 mm. Hg collected; it represents the 2-(6-methoxycarbonyl-hexyl)-3-oxo-1-cyclopentene-carboxylic acid methyl ester of the formula

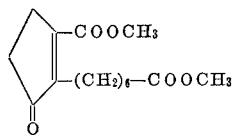

The mixture of 14.7 g. thereof, 100 ml. carbon tetrachloride and 11.56 g. N-bromo-succinimide is refluxed for two hours while stirring. It is then filtered, the filtrate evaporated in vacuo and the residue dissolved in 50 ml. acetic acid. To the solution 13.0 g. silver acetate are added and the mixture is stirred and refluxed for one hour under nitrogen. It is poured into excess cold 10% aqueous sodium bicarbonate and the mixture is extracted with diethyl ether. The extract is dried, evaporated, the residue distilled and the fraction boiling at 169–170°/0.01 mm. Hg collected; it represents the 2-(6-methoxycarbonyl-hexyl)-3-oxo-5-acetoxy-1 - cyclopentene-carboxylic acid methyl ester of the formula

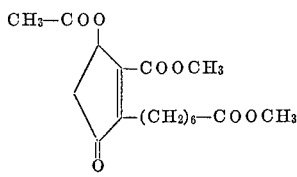

The solution of 10.1 g. thereof in 200 ml. 1.7 N-methanolic hydrochloric acid is allowed to stand at room temperature for 4 hours and then evaporated in vacuo. The residue is taken up in diethyl ether, the solution washed with water, dried, filtered and evaporated. The residue is chromatographed on 300 g. silica gel and eluted with ethyl acetate-methylene chloride (1:4) and (3:2). The latter eluate yields the desired 2-(6-methylcarbonyl-hexyl)-3-oxo-5-hydroxy - 1 - cyclopentene-carboxylic acid methyl ester, boiling at 156–158°/0.01 mm. Hg. (Its semicarbazone melts at 140–141° after recrystallization from aqueous methanol.)

3.0 g. thereof are dissolved in 100 ml. diethyl ether and 10 ml. trimethylsilyl chloride are added dropwise while stirring, followed by 15 ml. triethylamine. After stirring for ½ an hour at room temperature, the mixture is filtered and the filtrate evaporated in vacuo. The residue is chromatographed on 250 g. silica gel and eluted with ethyl acetate-methylene chloride (1:9), to yield the 2-(6-methoxycarbonyl-hexyl)-3 - oxo-5-trimethylsiloxy-1-cyclopentene-carboxylic acid methyl ester of the formula

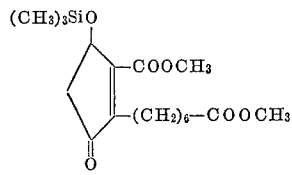

3.8 g. thereof are hydrogenated in 50 ml. methanol over 2 g. Raney nickel at 47 p.s.i. initial pressure at room temperature. After about 90 minutes the mixture is filtered and the filtrate evaporated in vacuo to yield the 2α-(6-methoxycarbonyl - hexyl)-3-oxo-5α-trimethylsiloxy-cyclopentane-carboxylic acid methyl ester of the formula

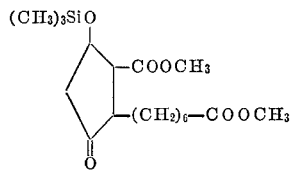

which shows in the U.V. spectrum only end-absorption; M.P. 22–24°.

The mixture of 3.5 g. thereof, 30 ml. pyridine and 8.0 g. O-methyl-hydroxylamine hydrochloride, is allowed to stand at room temperature for 24 hours. It is then evaporated in vacuo, the residue taken up in water, the mixture extracted with diethyl ether, the extract dried, filtered and concentrated. After cooling the 2α-(6-methoxycarbonyl-hexyl) - 3 - methoxyimino - 5α - hydroxy-cyclopentane-carboxylic acid methyl ester of the formula

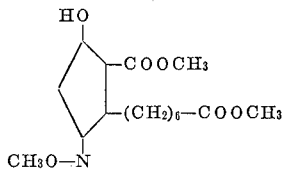

crystallizes and melts, after recrystallization from a large volume hexane, at 46–47°. It shows in the N.M.R. spectrum peaks at 159, 166, 219, 224 and 230 cps., and exhibits hypotensive effects.

In the analogous manner the 2α-(6-methoxy-carbonyl-hexyl)-3-hydroxyimino - 5α - hydroxy-cyclopentane-carboxylic acid methyl ester is obtained, melting at 97–98° after recrystallization from benzene-hexane.

15.8 g. of the methyloxime are dissolved in 450 ml. methanol and 450 ml. 10% aqueous potassium carbonate are added. The mixture is refluxed for 2 hours, cooled and extracted with diethyl ether. The aqueous layer is acidified with ice cold hydrochloric acid, saturated with ammonium sulfate and extracted with diethyl ether. The extract is dried, filtered and to the filtrate etheral diazomethane is added until the yellow color persists. After standing for 1½ hours at room temperature, the mixture is washed with 10% aqueous potassium bicarbonate, dried and evaporated to yield the 2β-(6-methoxycarbonyl-hexyl) - 3 - methoxyimino-5β-hydroxy-cyclopentane-carboxylic acid methyl ester of the formula

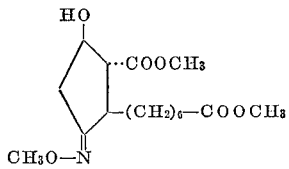

showing in the N.M.R. spectrum peaks at 229, 223 and 218 cps. In the thin layer chromatogramm (silica gel), eluted by ethyl acetatechloroform 1:1, it travels faster than its above-described epimer.

The mixture of 3.05 g. thereof, 175 ml. methylene chloride, 1.3 g. dihydropyrane and 75 mg. picric acid is allowed to stand at room temperature for 24 hours. Hereupon it is evaporated in vacuo, the residue taken up in 40 ml. diethyl ether, the solution washed with 10% aqueous potassium bicarbonate and evaporated. The residue is chromatographed on 100 g. silica gel and eluted with ethyl acetate-methylene chloride (1:19) and (1:9). The latter eluate yields the 2β-(6-methoxycarbonyl-hexyl) - 3 - methoxyimino-5β-(2-tetrahydropyranyloxy)-cyclopentane-carboxylic acid methyl ester, of the formula

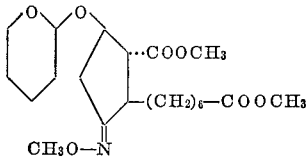

showing in the N.M.R. spectrum peaks at 277, 229, 223 and 219 cps.

To the solution of 1.7 g. thereof in 25 ml. anhydrous ethanol, 3.4 g. sodium borohydride are added portionwise and the mixture is stirred at room temperature for 3½ hours. Hereupon ice and water are added, the mixture extracted with diethyl ether, the extract dried and evaporated. The residue is chromatographed on 60 g. silica gel and eluted with ethyl acetate-methylene chloride (1:4) and (2:3). The latter eluate yields the ω-[2α-hydroxy-methyl-3β-(2-tetrahydropyranyloxy) - 5 - methoxyimino-cyclopentyl]-heptanoic acid ethyl ester of the formula

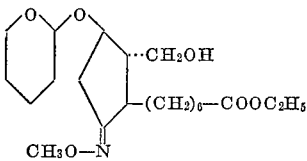

showing in the N.M.R. spectrum peaks at 280, 247 and 229 cps.

To the stirred mixture of 0.5 g. thereof, 6 ml. dimethyl sulfoxide and 6 ml. benzene, the mixture of 0.15 ml. pyridine and 0.08 ml. trifluoroacetic acid is added, followed by 1.8 g. 1-cyclohexyl-3-(2-morpholino-ethyl)-carbodiimide metho-p-toluene sulfonate. The mixture is allowed to stand for 24 hours at 4° and is then shaken with diethyl ether and ice water. The organic layer is dried, filtered and evaporated to yield the 2β-(6-ethoxycarbonyl - hexyl) - 3 - methoxyimino-5β-(2-tetrahydropyranyloxy)-cyclopentane-aldehyde of the formula

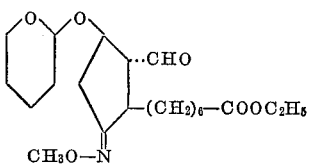

showing in the N.M.R. spectrum peaks at 536, 277, 247 and 229 cps.

The solution of 0.4 g. thereof in 5 ml. diethyl ether is combined with the tri-n-butyl-phosphorane obtained from 350 mg. 1-chloro-2-heptanone and 410 mg. tri-n-butylphosphine in refluxing chloroform, treatment of the resulting phosphonium compound with 2 N-aqueous sodium hydroxide, distillation and collection of the fraction boiling at 144–146/0.02 mm. Hg. The mixture is allowed to stand at room temperature for 90 minutes, and then evaporated. The residue is chromatographed on 25 g. silica gel and eluted with ethyl acetate-methylene chloride (1:19), to yield the ω-[2α-(3-oxo-1-octenyl)-3β-(2-t etrahydropyranyloxy) - 5 - methoxyimino - cyclopentyl]-heptanoic acid ethyl ester of the formula

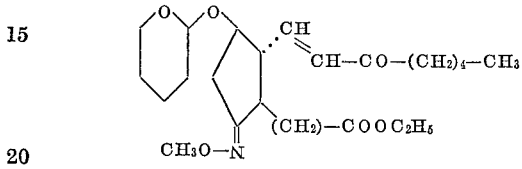

showing in the N.M.R. spectrum peaks at 405, 372, 277, 247, 229 and 53 cps.

The mixture of 0.29 g. thereof, 25 ml. methanol and 5 drops N-hydrochloric acid, is stirred at room temperature for 2½ hours and evaporated in vacuo. The residue is taken up in diethyl ether, the solution washed with water, dried, filtered and evaporated. The residue is chromatographed on 8 g. silica gel and eluted with ethyl acetate-methylene chloride (1:19) and (1:4). The latter eluate yields the ω-[2α-(3-oxo-1-octenyl)-3β-hydroxy-5-methoxyimino-cyclopentyl]-heptanoic acid ethyl ester of the formula

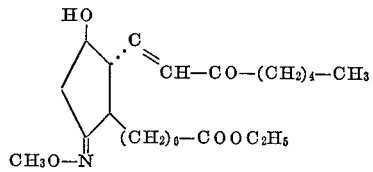

showing in the N.M.R. peaks at 405, 372, 247, 229 and 53 cps.

The corresponding free acid is obtained from 52 mg. thereof, 15 ml. methanol and 3 ml. 10% aqueous potassium carbonate while stirring overnight at room temperature. The mixture is then diluted with water, acidified with hydrochloric acid, saturated with ammonium sulfate and extracted with diethyl ether. The extract is dried, filtered and evaporated to yield said heptanoic acid derivative, which is recrystallized from pentane-diethyl ether while cooling in an ice salt bath; it melts at room temperature.

To the solution of 0.2 g. thereof in 20 ml. 1,2-dimethoxy-ethane, 0.4 g. lithium 3-tert. butoxy-aluminum hydride are added portionwise and the mixture stirred at room temperature for 4 hours. It is evaporated in vacuo below 35°, the residue taken up in 10 ml. water, the solution adjusted to a pH of 3–4 with cold N-hydrochloric acid and extracted with diethyl ether. The extract is dried, filtered, evaporated and the residue chromatographed on 40 g. infusorial earth and eluted with the upper phase obtained from the mixture of (a) the lower phase of 560 ml. methanol and 684 ml. water, (b) 60 ml. octanol and (c) 60 ml. chloroform, at room temperature. The combined 5 ml. samples containing the 2 major peaks are evaporated in vacuo, to yield 2 epimers of the ω-[2α-(3 - hydroxy - 1 - octenyl)-3β-hydroxy-5-methoxyimino-cyclopentyl]-heptanoic acid of the formula

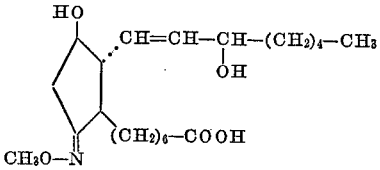

I claim:
1. A compound of the formula

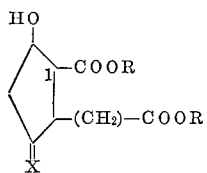

or its 1α-epimer, in which X stands for lower alkoxyimino, lower alkenyloxyimino, cycloalkoxyimino or cycloalkylalkoxyimino with 3 to 6 ring- and 1 to 4-chain-carbon atoms, or halo-lower alkoxyimino and R stands for lower alkyl or the free dicarboxylic acid of the 1α-epimer or the tetrahydro-2-pyranyl ether of the cyclopentanol-1α-epimer-di-lower alkyl ester.

2. A compound as claimed in claim 1 and being a 2α-(6-lower alkoxycarbonyl-hexyl)-3-lower alkoxyimino-5α-hydroxy-cyclopentane-1α-carboxylic acid lower alkyl ester.

3. A compound as claimed in claim 1 and being a 2β-(6-lower alkoxycarbonyl-hexyl)-3-lower alkoxyimino-5β-hydroxycyclopentane-1α-carboxylic acid lower alkyl ester or the 2-tetrahydropyranyl ether thereof.

4. A compound as claimed in claim 1 and being the 2α-(6 - methoxycarbonyl - hexyl) - 3 - methoxyimino - 5α-hydroxy-cyclopentane-1α-carboxylic acid methyl ester.

5. A compound as claimed in claim 1 and being the 2β-(6 - methoxycarbonyl - hexyl) - 3 - methoxyimino - 5β-hydroxy-cyclopentane-1α-carboxylic acid methyl ester.

6. A compound as claimed in claim 1 and being the 2β-(6 - methoxycarbonyl - hexyl) - 3 - methoxyimino - 5β-(2 - tetrahydropyranyloxy) - cyclopentane - 1α - carboxylic acid methyl ester.

No references cited.

NORMA S. MILESTONE, Primary Examiner

U.S. Cl. X.R.
260—340.3, 340.5, 465.4, 448.2, 468, 514

UNITED STATES PATENT OFFICE
CERTIFICATE OF CORRECTION

Patent No. 3,538,120  Dated November 3, 1970

Inventor(s) Neville Finch

It is certified that error appears in the above-identified patent and that said Letters Patent are hereby corrected as shown below:

Column 1, under "Abstract of the Disclosure", the bottom of the structural formula should read ---

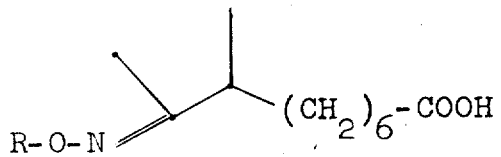

---.

Column 3, line 10, the left-hand side of structural formula (II), should read ---

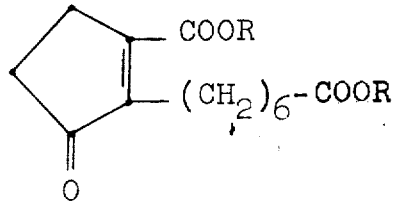

---.

Column 3, line 75, the structural formula should read ---

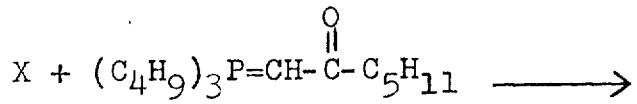

---.

Column 5, line 21, "material" should read --- natural ---.

Column 8, lines 15-20, the right-hand side of the structural formula should read ---

UNITED STATES PATENT OFFICE
CERTIFICATE OF CORRECTION

Patent No. 3,538,120                     Dated November 3, 1970

Inventor(s) Neville Finch

It is certified that error appears in the above-identified patent and that said Letters Patent are hereby corrected as shown below:

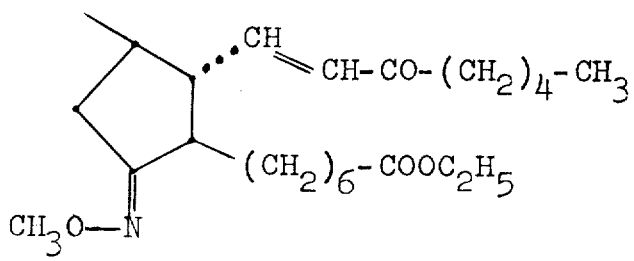

Column 8, lines 35-40, the structural formula should read ---

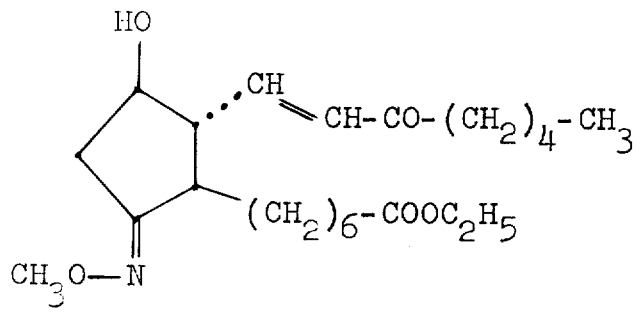

Signed and sealed this 27th day of June 1972.

(SEAL)
Attest:

EDWARD M. FLETCHER, JR.            ROBERT GOTTSCHALK
Attesting Officer                  Commissioner of Patents